United States Patent
Brinkmeyer et al.

(10) Patent No.: US 6,329,901 B2
(45) Date of Patent: *Dec. 11, 2001

(54) ELECTRONIC VEHICLE KEY

(75) Inventors: Horst Brinkmeyer, Waiblingen; Gerhard Nagel, Nufringen; Thomas Rick, Backnang; Guenter Schwegler, Weinstadt; Juergen Setzer, Illingen, all of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,896

(22) Filed: Oct. 21, 1997

(30) Foreign Application Priority Data

Oct. 23, 1996 (DE) ............................ 196 43 759

(51) Int. Cl.⁷ ........................................... G06F 7/00
(52) U.S. Cl. ..................... 340/5.4; 340/5.2; 340/5.33; 340/5.42; 340/426
(58) Field of Search ................ 340/825.33, 825.31, 340/426, 5.2, 5.33, 5.4, 5.42; 307/10.3, 10.4; 180/287

(56) References Cited

U.S. PATENT DOCUMENTS

| | | |
|---|---|---|
| 4,159,467 | 6/1979 | Ballin ............................ 340/64 |
| 5,552,789 * | 9/1996 | Schuermann ............ 340/825.31 |
| 5,631,947 * | 5/1997 | Wittstein et al. ............... 379/59 |

FOREIGN PATENT DOCUMENTS

| | | |
|---|---|---|
| 43 31 498 | 3/1995 | (DE) . |
| 44 09 166 C1 | 6/1995 | (DE) . |
| 44 15 052 A1 | 11/1995 | (DE) . |
| 195 13 498 C1 | 6/1996 | (DE) . |
| 0 628 928 | 12/1994 | (EP) . |
| WO 93/14571 | 7/1993 | (WO) . |

* cited by examiner

*Primary Examiner*—Michael Horabik
*Assistant Examiner*—Yves Dalencourt
(74) *Attorney, Agent, or Firm*—Crowell & Moring LLP

(57) ABSTRACT

An electronic vehicle key has a radio receiver for receiving radio call information which is transmitted by a control center, and a key communication device for communicating with a vehicle communication device in an associated vehicle, signals transmitted by the key communication device to the vehicle communication device serving to activate or deactivate an immobilizer on the vehicle. According to the invention, a key controller, which administers a mobility account, is provided in the electronic vehicle key; and radio call information is transmitted by a control center is registered as a "credit" in the mobility account. Relevant events are processed as "debits" in the mobility account, and deactivation or activation of the immobilizer on the vehicle is dependent on the account value of the mobility account.

21 Claims, 1 Drawing Sheet

ELECTRONIC VEHICLE KEY

This application claims the priority of German patent document 196 43 759.8, the disclosure of which is expressly incorporated by reference herein.

BACKGROUND AND SUMMARY OF THE INVENTION

The invention relates to an electronic vehicle key.

German patent document DE 195 13 498 C1 describes an electronic vehicle key of the generic type which is part of a vehicle security system in which an immobilizer is activated in the vehicle if a vehicle communication device on the vehicle no longer receives use-enabling data from a key communication device arranged in the electronic vehicle key. The outputting of the use-enabling data by the vehicle key is associated with the regular reception of use-enabling radio call information which is transmitted by a control centre and received and decoded by a radio receiver in the vehicle key.

However, a disadvantage of this arrangement is that, under unfavourable circumstances when the use-enabling radio call information can no longer be received, the immobilizer could be unintentionally activated. In addition, the radio receiver in the vehicle key is always in an active state and continuously draws power.

German patent document DE 44 09 166 C1 discloses that a key controller, which has a credit memory that is filled up with sums of money by a control centre and can be emptied by relevant events, is provided for electronic vehicle key communication. However, this publication does not solve the problem of improving the protection against theft for a motor vehicle or of preventing undesired activation of an electronic immobilizer.

German patent document DE 44 15 052 A1 discloses a vehicle security system in which a controller with a radio transceiver for a mobile radio network is provided in the vehicle. The controller is connected to an immobilizer on the vehicle, and transmits from time to time a message to a control centre via the mobile radio network. The controller activates the immobilizer if the vehicle has not received any use-enabling radio call information from the control centre after a specific number of operational events.

The object of the present invention is to develop an electronic vehicle key of the generic type described above, in which the risk of undesired activation of an electronic immobilizer in the vehicle is effectively.

This object is achieved by the vehicle key arrangement according to the invention, in which, a radio receiver in the vehicle key receives radio call information transmitted by a control centre, and a key communication device communicates with a vehicle communication device in an associated vehicle, the signals transmitted by the key communication device to the vehicle communication device serving to activate or deactivate an immobilizer on the vehicle. In addition, a key controller, which administers a mobility account, is provided in an electronic vehicle key of the generic type. Use-enabling radio call information, which is transmitted by the control centre and received by means of the radio receiver in the key, is registered by the key controller as "credit" in the mobility account. Conversely, relevant events are processed by the key controller as "debits" in the mobility account. The associated vehicle can be started up or operated only for as long as the "credit" in the mobility account has not dropped below a prescribed account value, referred to below as "zero" account value.

The radio call information transmitted by the control centre is transmitted in an encoded form and decoded and checked by the key controller. For encoding or decoding the radio call information, it is possible to use various known methods, of which further details will not be given here.

The "credit" in the mobility account can be implemented, for example, by means of a counter which decrements in an event-controlled fashion, and which is incremented to a "maximum credit" by the key controller when the use-enabling radio call information is received. The relevant events, which are processed as "debits" and as a result of which the counter is decremented, or the "credit" is reduced, can be, for example, starting of the engine, opening of a door, refuelling or driving on a prescribed route. The vehicle communicates the relevant events to the key controller via the vehicle communication device and the key communication device, in order to update the "credit" in the mobility account.

Thus, for example the use-enabling radio call information may contain an authorization to start the engine 10 times. This value (10 engine starts) is registered as "maximum credit" in the mobility account. Each engine start is then processed as a relevant event or "debit" from the "credit" in the mobility account, and the "credit" in the mobility account is then decremented by one engine start at each engine start. In addition, any desired logical combinations of relevant events are conceivable. Thus, for example, the use can be limited by the number of engine starts and the coverage of a specific distance (for example 100 kilometres are registered as "maximum credit"). If the "credit" in the mobility account reaches the "zero" account value, an immobilizer on the vehicle can be activated and further operation of the vehicle prevented or renewed deactivation of the immobilizer on the vehicle can be blocked the next time the vehicle is started up.

When use is authorized, use-enabling radio call information, which always increments the "credit" in the mobility account back to the "maximum credit" is regularly received by the radio receiver. This prevents the "zero" account value from being reached. The "maximum credit" should be selected to be of such a magnitude that "areas of no radio coverage" can be travelled through without difficulty, but at the same time the area of activity of the vehicle is restricted to such a degree that in the case of unauthorized use, the vehicle cannot be taken too far away. In addition, there is the possibility of an authorized user requesting a larger "maximum credit" from the control centre or requesting an immediate transmission of use-enabling radio call information if, for example, he realizes that he must travel through a large area in which radio call information cannot be received.

A relevant event can also be distinguished by the expiration of a prescribed time interval. The mobility account then executes a stopclock function, in which, as already described, the use-enabling radio call information, for example enabling of use for 6 hours, can be registered as "maximum credit" in the mobility account, from which "debits" are then made at prescribed intervals (considered as relevant events, while a vehicle is being used). In such cases it is possible to integrate the necessary timer into the mobility account, so that the "debits" from the "credit" in the mobility account are carried out automatically in the mobility account. The key controller checks the account value of the "credit" in the mobility account only regularly, or the mobility account informs the key controller when specific account values are reached.

However, it is also possible to integrate the timer at another point in the vehicle key or in the vehicle, or to use a timer which is already present in the vehicle. The timer then communicates its time information to the key controller, and the "credit" in the mobility account is then decremented at regular intervals (for example every 10 minutes) by the key controller. When the credit in the mobility account has reached the "zero" account value, the vehicle is prevented from being operated further or from being started up again.

In a further embodiment, a specific time, for example a specific time of day, if appropriate in conjunction with a specific date, can be registered as "maximum credit" in the mobility account. The key controller then regularly compares time from a timer representing the current time of day with the time registered as "maximum credit" in the mobility account. If the time stored as "maximum credit" in the mobility account is exceeded, the vehicle is prevented from being operated further or from being started up again, as already described.

In this embodiment, there is no "debiting" from the "credit" in the mobility account. Rather, the time interval between the specific time and the current time of day can be regarded as the "credit". The minimum account value is then understood as a specific minimum time interval, for example 30 minutes. The "zero" account value is then reached when the current time of day corresponds to the specific time registered as "maximum credit".

This embodiment of the mobility account can be combined with the embodiment of the mobility account already described and is particularly suitable for vehicle rental systems in which a user of the vehicle rents it only for a specific time period, for example three days. The date and the time of day of expiration of the rental contract are then registered as "maximum credit" in the mobility account. If a user wishes to extend a rental contract, he must get in contact with the rental company and the latter then communicates, as use-enabling radio call information, the new expiration date as "maximum credit" to the mobility account in the vehicle key.

In addition, it is conceivable to store in the key controller a fixed "maximum credit" which is registered in the mobility account whenever the use-enabling radio call information transmitted to the vehicle key is received. Thus, the "maximum credit" can be distinguished, for example, by 10 engine starts. In this way, the invention can be implemented relatively easily since only one type of relevant event has to be taken into consideration.

One advantage of the invention is that, even in areas in which the radio call information cannot be received (for example in so-called areas of no radio coverage), it is possible for an authorized user to deactivate the immobilizer when the vehicle is started up, or for the authorized user to be prevented from activating the immobilizer while the vehicle is operating.

The arrangement of the mobility account in the vehicle key and not in the vehicle has the additional advantage that, in the case of system adaptations, for example because of different (country-specific) versions of the radiopaging service, changes have to be carried out only in the vehicle key, whereas the device in the vehicle remains unchanged.

In one embodiment of the invention, when the "credit" in the mobility account have reached the "zero" account value, regardless of whether the associated vehicle is currently being operated, the vehicle is prevented from being started up again by virtue of the fact that data which are necessary to deactivate the immobilizer on the vehicle are not transmitted to the vehicle by the vehicle key. In this embodiment, it is not possible to activate the immobilizer on the vehicle while the vehicle is operating. This measure virtually excludes the possibility of being a hazard to flowing traffic, since the immobilizer is not activated until the vehicle is no longer operating, for example as a result of the vehicle key being withdrawn from the ignition lock.

In another embodiment, when the "credit" in the mobility account reaches the "zero" account value while the vehicle is operating, the operation of the vehicle can be shut off immediately if the possibility of being a hazard to traffic, for example when stopping at a traffic light, is excluded. This measure has the advantage that the vehicle can no longer be automatically moved forward once unauthorized use has been detected.

Various known methods can be used for communication between the electronic vehicle key and the associated vehicle by means of the key communication device and the vehicle communication device for deactivating or activating the immobilizer on the vehicle. Thus, in a first method, the key controller regularly transmits a use-enabling signal to the associated vehicle while the vehicle is operating for as long as the "credit" in the mobility account has not yet reached the "zero" account value. If the "zero" account value is reached, the use-enabling signal is no longer transmitted and the immobilizer on the vehicle is activated or renewed deactivation of the immobilizer when the vehicle is next started up is prevented.

In a second method, the key controller transmits a use-disabling signal to the vehicle when the "credit" in the mobility account has reached the "zero" account value, as a result of which the immobilizer on the vehicle is activated or renewed deactivation of the immobilizer when the vehicle is next started up is prevented.

In addition, in the event that vehicle key is lost or stolen, or if the user is forced to hand over the vehicle key to an unauthorized user, the control centre can transmit a use-disabling radio call signal to the respective vehicle key, causing the immobilizer in the vehicle to be activated or preventing the deactivation of the immobilizer, even if the "credit" in the mobility account in the respective vehicle key has not yet reached the "zero" account value.

In order to prevent the immobilizer from being deactivated when the associated vehicle is started up, there may be provision, for example, for the key communication device to be disabled by the key controller, in order to prevent communication between the vehicle key and the associated vehicle. In this case, it is possible not only to prevent the immobilizer from being deactivated but also to prevent other vehicle assemblies, such as a central locking system, a convenient locking system etc. from being actuated.

In addition, visual and/or audible indicator means may be provided which, when the "credit" in the mobility account reaches, or drops below, a prescribed minimum account value (for example when the "credit" in the mobility account comprises only a further four relevant events or a further 30 minutes period of use), inform a user that the "credit" in the mobility account is almost used up. These indicator means can be provided both in the vehicle key and in the vehicle.

In one advantageous refinement of the invention, the radio receiver is activated by the key controller only when required. As a result, the power drain of the electronic vehicle key is minimized.

In one particularly advantageous refinement of the invention, the key controller activates the radio receiver as a function of the prescribed "credit" in the mobility account (for example the minimum account value), so that new use-enabling radio information can be received to increase the "credit" in the mobility account back to the "maximum credit". After the new use-enabling radio call information has been received, the key controller deactivates the radio receiver again. This arrangement reduces the power consumption of the vehicle key. Of course, use-enabling radio information is transmitted by the control centre only if the use of the vehicle has been authorized.

In addition, it is possible for the key controller to activate the radio receiver regularly, irrespective of the account value of the "credit" in the mobility account, in order to determine whether it is at all possible for radio call information (which does not need to be directed to the vehicle key associated with this radio receiver) to be received at a location in which the vehicle is currently located. If the radio receiver does not receive any radio call information, for example in so-called "areas of no radio coverage", the user can be informed of this by the indicator means and the radio receiver remains activated until radio call information can be received again.

Furthermore, it is also possible for a vehicle manufacturer to lease a specific radio channel over which the use-enabling radio call information is transmitted for all of the manufacturer's vehicles. Use-enabling radio call information can be transmitted in this case a specific sequence and/or at a specific time of day. The key controller then knows when the radio receiver has to be activated to receive the use-enabling radio call information in order to enable the vehicle to operate.

The reservation of a specific radio channel is particularly suitable for vehicle rental systems since in such systems only a specific, relatively small number of vehicles have to be managed by the control centre. Thus, a rental company may, for example have hired a specific radio channel daily from 2.00 pm to 3.00 pm. In this period, the use-enabling radio call information for the vehicles of the rental company is transmitted in a specific sequence. The key controllers then always activate their radio receivers at 2.00 pm in order to receive and evaluate the use-enabling radio call information.

Already existing systems, such as radio paging services via terrestrial transmitters or via satellites are particularly suitable as telecommunications paths for the transmission of the radio call information. In addition, existing mobile radio networks may also be used.

The aforementioned visual and/or audible indicator means in the vehicle key may also be used to indicate a personal radio call message, if appropriate visual and/or audible indicator elements in the vehicle may be used to communicate the personal radio call message. The audible indicator means here may be implemented as voice outputting means.

Other objects, advantages and novel features of the present invention will become apparent from the following detailed description of the invention when considered in conjunction with the accompanying drawings.

DETAILED DESCRIPTION OF THE DRAWINGS

Figure 1:
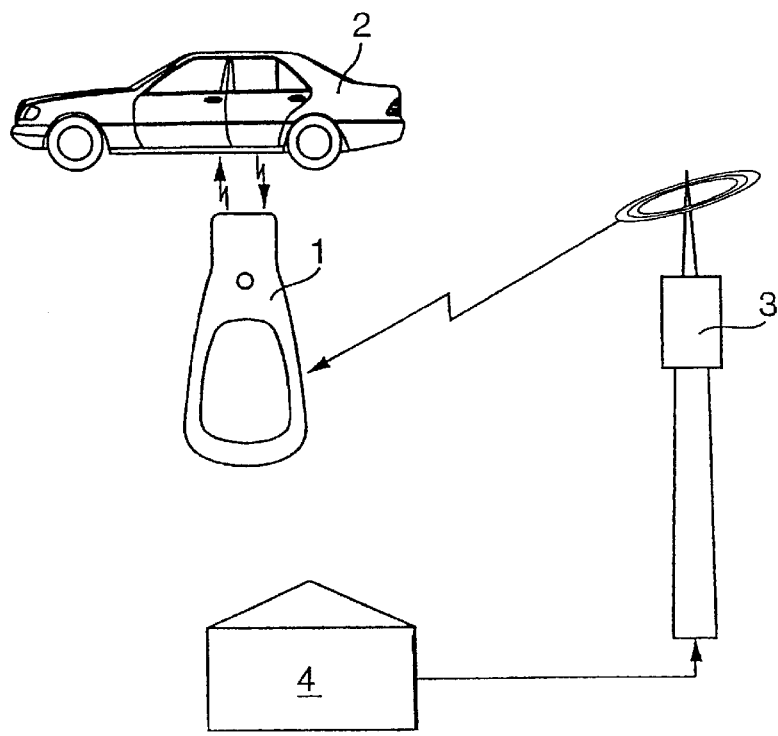
FIG. 1 shows a schematic view of a vehicle security system according to the invention.

FIG. 1 illustrates the components for transmitting radio call information from a control centre 4 via a terrestrial transmitter 3 to an electronic vehicle key 1 which designed for bidirectional data communication with an associated vehicle 2. Instead of the terrestrial transmitter 3, a satellite system may also be used to transmit the radio call information from the control centre 4 to an electronic vehicle key.

Figure 2:
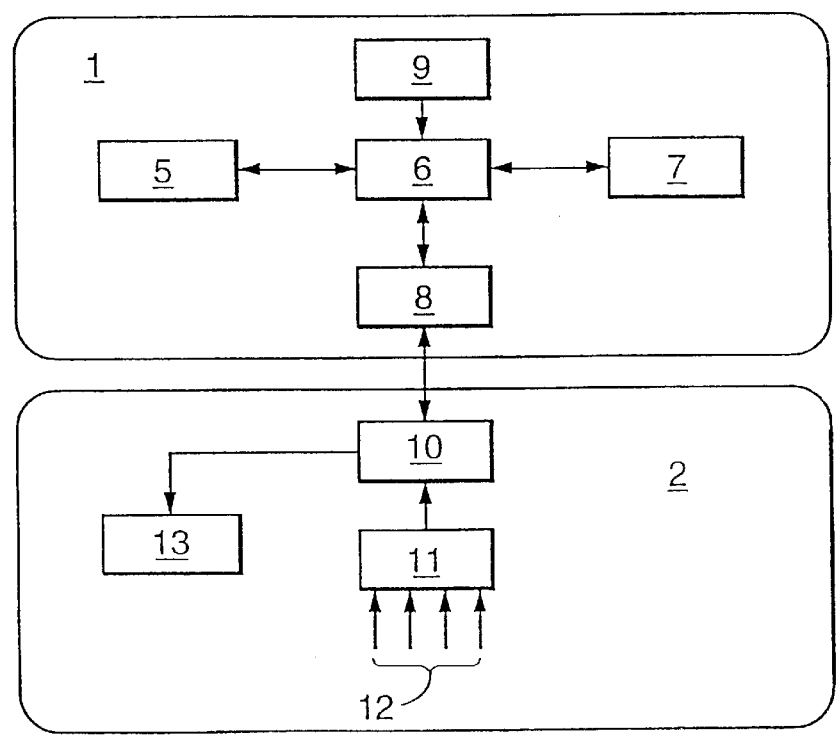
FIG. 2 shows a block diagram of relevant assemblies in the electronic vehicle key and in the vehicle.

As is clear from FIG. 2, the vehicle security system comprises a portable electronic vehicle key 1 with a radio receiver 5, a key controller 6, a mobility account 7, a first detection device 9, which is designed, for example, as a timer, and a key communication device 8. The associated vehicle 2 has a vehicle communication device 10, a second detection device 11, which has information inputs 12 via which, for example, the current kilometre reading/mileage, the date, the current time of day and other information for evaluation and/or further processing are transmitted to the detection device 11, and an electronic immobilizer 13.

The Mode of Operation is as Follows

The radio receiver 5 receives radio call information, which is transmitted from a control centre 4. Use-enabling radio call information is decoded by the key controller 6, checked and registered as "credit" in the mobility account 7. In the use-enabling radio call information it is possible to transmit, for example, a fixed number of engine starts (for example 10 engine starts), a specific permitted period of use (for example 24 hours), a use up to a specific time (for example use up to 23.11.1996 12.00 noon) or a specific permitted distance (for example 100 kilometres) to the radio receiver 5 in the electronic vehicle key 1.

The electronic immobilizer 13 on the vehicle can be deactivated in order to start up the vehicle 2 only if an authorized user has been detected during a communication between the key communication device 8 and the vehicle communication device 10, and if the key controller 6 determines, when checking the "credit" in the mobility account 7, that the "zero" account value has not yet been reached. For communication between the key communication device 8 and the vehicle communication device 10 for determining whether an authorized user wishes to start up the vehicle, any methods known from the prior art may be used of which further details will not be given here.

While the vehicle 2 is operating, the key controller 6 regularly receives, from the first and/or second detection device 9; 11, information on relevant events which are registered as "debits" in the mobility account 7. After the "debiting", the key controller 6 checks whether the new "credit" in the mobility account 7 corresponds to a minimum account value, or whether the "zero" account value is present or whether a prescribed time has been exceeded. If the minimum account value has been reached, this is communicated to the user via visual and/or audible indicator means. At the same time, the key controller 6 activates the radio receiver 5, so that new use-enabling radio call information can be received. If the "zero" account value is reached while the vehicle is operating or if a prescribed time is exceeded, this is communicated to the vehicle 2 via the key communication device 8 and the vehicle communication device 10, causing the electronic immobilizer 13 on the vehicle to be activated in such a way that the possibility of being a hazard to traffic is virtually excluded and the vehicle 2 is prevented from operating further. If the "zero" account value is reached during a pause in operation or if the prescribed time is exceeded, the electronic immobilizer 13 is prevented from being deactivated when an attempt is made to start up the vehicle again. This can be implemented, for example, by the key communication device 8 being blocked by the key controller 6.

However, it is also possible for the activation of the electronic immobilizer 13 or the prevention of the deactivation of the immobilizer 13 when starting up the vehicle to be brought about by means of an item of use-disabling radio call information transmitted by the control centre 4. In such a case, the "credit" in the mobility account 7 is disregarded. This use-disabling radio call information is transmitted by the control centre 4 at the request of an authorized user if he has, for example, lost the electronic vehicle key 1 or if he has been forced to hand over the electronic vehicle key 1 to an unauthorized user.

While the vehicle 2 is operating, the key controller 6 also regularly activates the radio receiver 5 after a specific time interval has elapsed (for example every 60 minutes), except when the minimum account value is reached, the key controller 6 checking whether it is at all possible to receive radio call information at the current location. If not, the user is so informed via the visual and/or audible indicator means. At the same time, the radio receiver 5 remains activated until radio call information can be received again. This radio call information does not have to be addressed to the respective vehicle 2 becuase it is only concerned with determining whether or not a so-called "area of no radio coverage" is being travelled through.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electronic vehicle key comprising:
    a radio receiver for receiving radio call information which is transmitted by a control center;
    a key communication device for communicating with a vehicle communication device in an associated vehicle, signals transmitted by the key communication device to the vehicle communication device serving to activate or deactivate an immobilizer on the vehicle; and
    a key controller provided in the electronic vehicle key, said key controller including means for storing and updating a mobility account, wherein
       the key controller processes use-enabling radio call information transmitted to the vehicle key by the control center and in response thereto registers a "maximum credit" in the mobility account in the vehicle key;
       the key controller registers relevant events as "debits" in the mobility account in the vehicle key; and
       the key controller enables the vehicle key to transmit a signal to the vehicle to deactivate the immobilizer only if the "credit" in the mobility account has not yet reached a prescribed account value.

2. The electronic vehicle key according to claim 1, wherein if the "credit" in the mobility account has reached a prescribed account value, the immobilizer on the vehicle is activated by the electronic vehicle key.

3. The electronic vehicle key according to claim 1, wherein at least one detection device is provided for detecting relevant events, the relevant events being transmitted from the at least one detection device to the key controller.

4. The electronic vehicle key according to claim 1, wherein the radio receiver is activated by the key controller only when required.

5. The electronic vehicle key according to claim 4, wherein the radio receiver is activated by the key controller at prescribed times.

6. The electronic vehicle key according to claim 4, wherein the radio receiver is activated by the key controller if the "credit" in the mobility account has reached a prescribed minimum account value.

7. The electronic vehicle key according to claim 4, wherein:
    the key controller regularly activates the radio receiver in order to determine whether radio call information can be received at a location; and
    when an "area of no radio coverage" is detected, the radio receiver remains activated until radio call information can be received again at the location.

8. The electronic vehicle key according to claim 6, wherein at least one visual and/or audible indicator device is provided, which informs a user that the "credit" in the mobility account has reached the prescribed minimum account value or that a "area of no radio coverage" has been detected.

9. The electronic vehicle key according to claim 7, wherein at least one indicator device is provided, which informs a user that the "credit" in the mobility account has reached the prescribed minimum account value or that a "area of no radio coverage" has been detected.

10. The electronic vehicle key according to claim 1, wherein the control centre transmits use-disabling radio call information, which prevents further use of the vehicle even if the "credit" in the mobility account has not yet reached a prescribed account value.

11. An electronic vehicle key comprising:
    a radio receiver for receiving radio call information which is transmitted by a control center;
    a key communication device for communication between the electronic vehicle key and a vehicle communication device in an associated vehicle, signals transmitted by the key communication device to the vehicle communication device serving to activate or deactivate an immobilizer on the vehicle; and
    a key controller provided in the electronic vehicle key, said key controller including means for storing and updating a mobility account; wherein
       the key controller processes radio call information transmitted to the vehicle key by the control center and in response thereto registers a "credit" in the mobility account in the vehicle key;
       the key controller processes relevant events as "debits" in the mobility account in the vehicle key; and
       the key controller regularly transmits a use-enabling signal to the associated vehicle as long as the "credit" in the mobility account has not yet reached a prescribed account value, it being no longer possible to deactivate the immobilizer on the vehicle if the use-enabling signal is not received.

12. The electronic vehicle key according to claim 11, wherein if the use-enabling signal is not received, the immobilizer on the vehicle is activated.

13. The electronic vehicle key according to claim 11, wherein at least one detection device is provided for detecting relevant events, the relevant events being transmitted from the at least one detection device to the key controller.

14. The electronic vehicle key according to claim 13, wherein a first detection device is arranged in the electronic vehicle key.

15. The electronic vehicle key according to claim 13, wherein:
    a second detection device is arranged in the associated vehicle; and
    relevant events are transmitted by the second detection device to the key controller via the vehicle communication device and the key communication device.

16. The electronic vehicle key according to claim 11, wherein the radio receiver is activated by the key controller only when required.

17. The electronic vehicle key according to claim 11, wherein the control centre transmits use-disabling radio call information, which prevents further use of the vehicle even if the "credit" in the mobility account has not yet reached a prescribed account value.

18. An electronic vehicle key comprising:
- a radio receiver for receiving radio call information which is transmitted by a control center;
- a key communication device for communicating with a vehicle communication device in an associated vehicle; signals transmitted by the key communication device to the vehicle communication device serving to activate or deactivate an immobilizer on the vehicle; and
- a key controller provided in the electronic vehicle key, said key controller including means for storing and updating a mobility account; wherein
   the key controller processes use-enabling radio call information transmitted by the control center and in response thereto registers as a "maximum credit" in the mobility account in the vehicle key, said use-enabling radio call information containing a specific time; and
   the key controller enables the electronic vehicle key to deactivate the immobilizer only if the specific time has not yet been exceeded.

19. The electronic vehicle key according to claim 18, when the specific time is exceeded, the key controller enables the vehicle key to activate the immobilizer on the vehicle.

20. The electronic vehicle key according to claim 18, wherein the radio receiver is activated by the key controller only when required.

21. The electronic vehicle key according to claim 19, wherein the control centre transmits use-disabling radio call information which prevents further use of the vehicle even if the specific time has not yet been exceeded.

* * * * *